(12) United States Patent
Priyadarshini et al.

(10) Patent No.: US 10,248,702 B2
(45) Date of Patent: Apr. 2, 2019

(54) INTEGRATION MANAGEMENT FOR STRUCTURED AND UNSTRUCTURED DATA

(71) Applicant: International Business Machines Corporation, Armonk, NY (US)

(72) Inventors: Pallavi Priyadarshini, Bangalore (IN); Parameswara R. Tatini, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 15/224,164

(22) Filed: Jul. 29, 2016

(65) Prior Publication Data

US 2018/0032591 A1 Feb. 1, 2018

(51) Int. Cl.
*G06F 17/30* (2006.01)
*G06Q 30/04* (2012.01)

(52) U.S. Cl.
CPC .. *G06F 17/30569* (2013.01); *G06F 17/30466* (2013.01); *G06F 17/30477* (2013.01); *G06F 17/30657* (2013.01); *G06Q 30/04* (2013.01)

(58) Field of Classification Search
CPC .............................................. G06F 17/30569
USPC ................................................. 707/714, 722
See application file for complete search history.

(56) References Cited

U.S. PATENT DOCUMENTS

| | | |
|---|---|---|
| 7,146,356 B2 | 12/2006 | Choi et al. |
| 7,849,049 B2 | 12/2010 | Langseth et al. |
| 2007/0011134 A1* | 1/2007 | Langseth .......... G06F 17/30563 707/999.001 |
| 2008/0263006 A1* | 10/2008 | Wolber ............. G06F 17/30545 707/999.003 |
| 2009/0327230 A1 | 12/2009 | Levin et al. |
| 2015/0142783 A1* | 5/2015 | Bruce .............. G06F 17/30575 707/722 |
| 2015/0261837 A1 | 9/2015 | Avasthi |

FOREIGN PATENT DOCUMENTS

| | | |
|---|---|---|
| WO | 2007005730 A3 | 1/2007 |
| WO | 2007005732 A3 | 1/2007 |

OTHER PUBLICATIONS

The Apache Software Foundation, Apache Hive TM, <http://hive.apache.org/>.
Xin et al.; "Introducing DataFrames in Apache Spark for Large Scale Data Science"; Databricks;<https://databricks.com/blog/2015/02/17/introducing-dataframes-in-spark-for-large-scale-data-science.html>.

* cited by examiner

*Primary Examiner* — Chelcie L Daye
(74) *Attorney, Agent, or Firm* — Robert C. Bunker (57) ABSTRACT

Disclosed aspects relate to structured data and unstructured data integration management to provide a valid Java Database Connectivity (JDBC) results-set. A query is received by a database driver. In response to receiving the query, a single data frame having both a set of structured data and a set of unstructured data is constructed in a dynamic fashion by the database driver. Based on the single data frame, a valid JDBC results-set for the query is compiled by the database driver. Accordingly, a query response having the valid JDBC results-set is provided by the database driver.

19 Claims, 5 Drawing Sheets

INTEGRATION MANAGEMENT FOR STRUCTURED AND UNSTRUCTURED DATA

BACKGROUND

This disclosure relates generally to database management systems and, more particularly, relates to a database driver with respect to integration management for structured data and unstructured data. Databases are used to store information for numerous types of applications. Examples include various industrial, commercial, technical, scientific, and educational applications. Database management systems (DBMSs) are a typical mechanism for accessing data stored in a database. DBMSs are typically configured to separate the process of storing data from accessing, manipulating, or using data stored in a database. DBMSs often require tremendous resources to handle the heavy workloads placed on such systems. As such, it may be useful to increase the performance of database management systems with respect to processing searches, or queries, to databases.

SUMMARY

Aspects of the disclosure relate to a database driver that can aggregate data between relational/structured and unstructured data sources, perform aggregation in real-time, and return query results from the aggregated data in a standard relational format so that existing relational database applications can utilize, ingest, or consume it. The database driver can include a mechanism to retrieve structured and unstructured data together as standard result sets. Having such capability may open-up existing Structured Query Language (SQL) database applications to seamlessly consume unstructured data without loading the unstructured data into the database. Aspects described herein may provide uniform access to unstructured data and dynamic joining of the unstructured data with structured data to provide seamless access for applications with little or no modification to the applications.

Disclosed aspects relate to structured data and unstructured data integration management to provide a valid Java Database Connectivity (JDBC) results-set. A query is received by a database driver. In response to receiving the query, a single data frame having both a set of structured data and a set of unstructured data is constructed in a dynamic fashion by the database driver. Based on the single data frame, a valid JDBC results-set for the query is compiled by the database driver. Accordingly, a query response having the valid JDBC results-set is provided by the database driver.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to a database driver that can aggregate data between relational/structured and unstructured data sources, perform aggregation in real-time (at the time of query execution), and return query results from the aggregated data in a standard relational format so that existing relational database applications can utilize, ingest, or consume it. The database driver can include a mechanism to retrieve structured and unstructured data together as standard result sets. Having such capability may open-up existing Structured Query Language (SQL) database applications to seamlessly consume unstructured data without loading the unstructured data into the database (e.g., having performance or efficiency benefits with respect to processing and network flow). Aspects described herein may provide uniform access to unstructured data and dynamic (e.g., real-time, on-the-fly) joining of the unstructured data with structured data to provide seamless access for applications with little or no modification to the applications.

Relational Database Management Systems (RDBMS) data is structured and widely used by enterprises to store enterprise data. Many RDBMS use SQL as database query language to retrieve data from database systems. Java Database Connectivity (JDBC) is a Java (trademark of Oracle) database connectivity technology that defines how a client application may access a database system using SQL. JDBC application program interface (API) is used in enterprise applications including Online Transaction Processing (OLTP) and Online Analytical Processing (OLAP) applications. JDBC drivers developed by database vendors are generally only capable of fetching data from vendor provided database systems.

With the recent technology improvements in big data technologies, enterprises analyze unstructured data available on social, web and many other unstructured data sources to derive insights about the business and trends. Many frameworks and software like Apache Hadoop and Apache Spark (trademarks of The Apache Software Foundation) have evolved to efficiently run analytics and access big data. Generally unstructured data is stored in formats such as JavaScript Object Notation (JSON), Apache Parquet (trademark of The Apache Software Foundation), comma-separated values (CSV), or the like. Challenges may continue to exist for enterprise application developers in order to integrate unstructured and structured data and to feed this aggregated data to applications which may be designed to work with standard JDBC API.

Aspects of the disclosure provide a Java framework for RDBMS SQL statement execution and saving results into a data frame, utilizing Apache Spark to load flat semi-structured files (e.g., JSON, Parquet, CSV), joining a plurality of data frames into a single data frame by using a join key, and converting the single data frame into a valid JDBC results-set. Seamless access to structured and unstructured data may be provided. On-the-fly joining of structured and unstructured data can be included. Applications may not need to have algorithms to parse unstructured data. Applications may not need to have stream parsing capability to access streaming data. Accordingly, applications may directly utilize a valid JDBC results-set without intermediary formatting operations. Other performance or efficiency benefits are also included such as those described herein.

Aspects of the disclosure include a method, system, and computer program product for structured data and unstructured data integration management to provide a valid Java Database Connectivity (JDBC) results-set. A query is received by a database driver. In response to receiving the query, a single data frame having both a set of structured data and a set of unstructured data is constructed in a dynamic fashion by the database driver. Based on the single data frame, a valid JDBC results-set for the query is compiled by the database driver. Accordingly, a query response having the valid JDBC results-set is provided by the database driver.

In embodiments, the single data frame is converted into the valid JDBC results-set by the database driver writing a set of extensions to a set of Apache Spark classes. In certain embodiments, the valid JDBC results-set is compiled without a conversion to a separate format. In various embodiments, the valid JDBC results-set is derived-from both the set of structured data and the set of unstructured data. In embodiments, the database driver may use the valid JDBC results-set to enable an application to access both the set of structured data and the set of unstructured data without modification to the application.

In embodiments, the query is received-from and the query response is provided-to an application configured without an unstructured data adapter. In various embodiments, the unstructured data adapter includes an algorithm to parse unstructured data or a stream parsing engine to access streaming data. In certain embodiments, the query includes an indicator which indicates that the application is configured without the unstructured data adapter. In embodiments, the database driver collects the set of structured data in a first data frame and collects the set of unstructured data in a second data frame. To construct the single data frame, the database driver may join the first and second data frames. In certain embodiments, the collection operation(s) includes using Apache Spark to parse the set of unstructured data and load the set of unstructured data in the second data frame.

In various embodiments, the set of unstructured data is ingested without loading the set of unstructured data into a database. In embodiments, aspects occur without using an Extract, Transform and Load (ETL) operation to capture the set of unstructured data in a structured database. In certain embodiments, the database driver may use a mainframe connector to bypass a database layer in order to access a set of storage devices having both the set of structured data and the set of unstructured data. In embodiments, a relational feature of the query may be converted into an unstructured feature. Accordingly, the query can be processed using the unstructured feature. Subsequently, the query response may be output in a relational format or the like.

Aspects of the disclosure may provide performance or efficiency benefits for structured data and unstructured data integration management to provide the valid JDBC results-set (e.g., speed, flexibility, responsiveness, resource usage, productivity). The set of operations (e.g., the receiving, the constructing, the compiling, the providing) can occur in an automated fashion without user intervention. Aspects may save resources such as bandwidth, processing, or memory.

Figure 1:
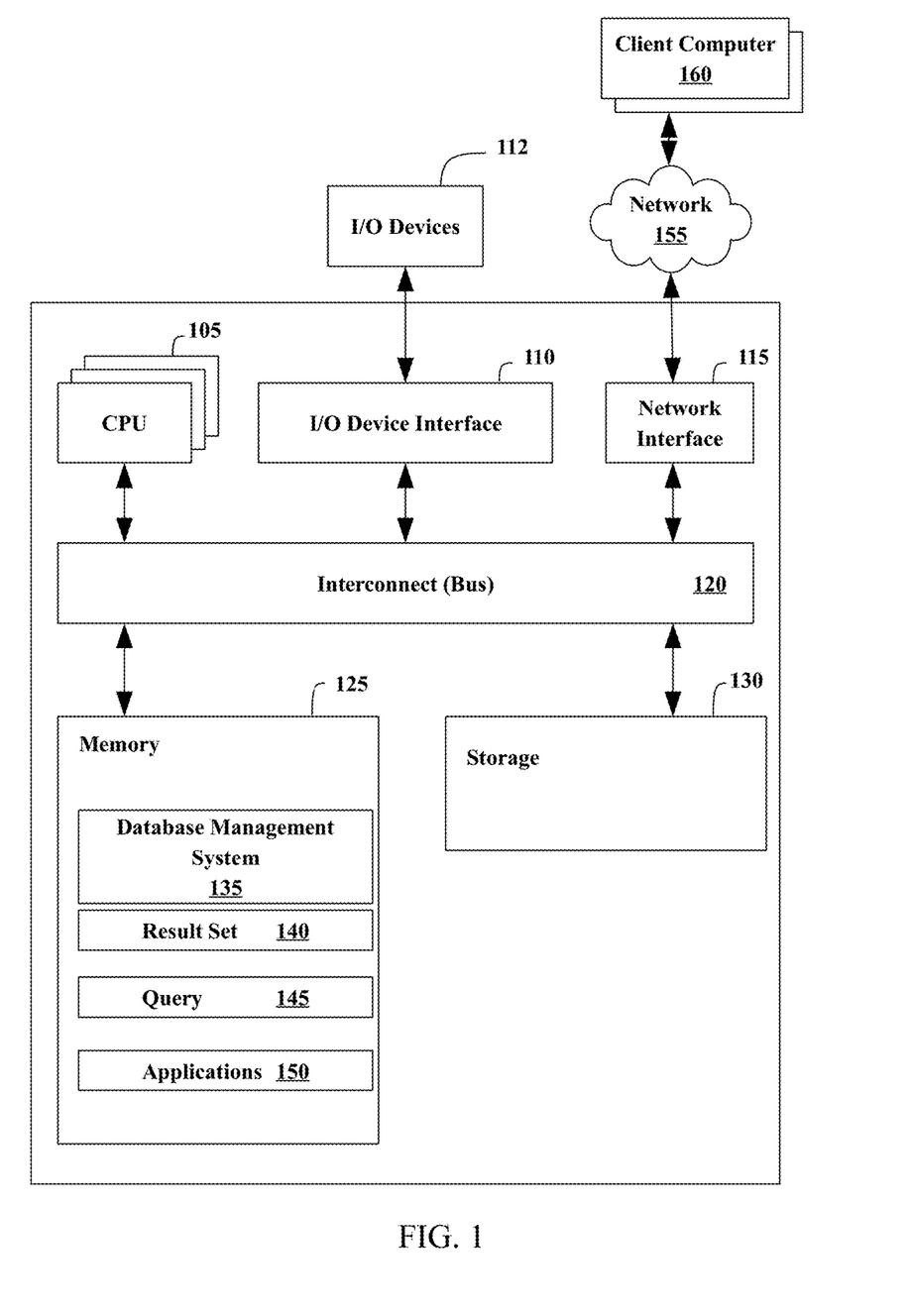
FIG. 1 illustrates an example representation of a computer system connected to a client computer via a network according to an embodiment.

FIG. 1 illustrates an example representation of a computer system 100 connected to one or more client computers 160 via a network 155, according to some embodiments. For the purposes of this disclosure, computer system 100 may represent practically any type of computer, computer system, or other programmable electronic device, including but not limited to, a client computer, a server computer, a portable computer, a handheld computer, an embedded controller, etc. In some embodiments, computer system 100 may be implemented using one or more networked computers, e.g., in a cluster or other distributed computing system.

The computer system 100 may include, without limitation, one or more processors (CPUs) 105, a network interface 115, an interconnect 120, a memory 125, and a storage 130. The computer system 100 may also include an I/O device interface 110 used to connect I/O devices 112, e.g., keyboard, display, and mouse devices, to the computer system 100.

Each processor 105 may retrieve and execute programming instructions stored in the memory 125 or storage 130. Similarly, the processor 105 may store and retrieve application data residing in the memory 125. The interconnect 120 may transmit programming instructions and application data between each processor 105, I/O device interface 110, network interface 115, memory 125, and storage 130. The interconnect 120 may be one or more busses. The processor 105 may be a single central processing unit (CPU), multiple CPUs, or a single CPU having multiple processing cores in various embodiments. In one embodiment, a processor 105 may be a digital signal processor (DSP).

The memory 125 may be representative of a random access memory, e.g., Static Random Access Memory (SRAM), Dynamic Random Access Memory (DRAM), read-only memory, or flash memory. The storage 130 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 115 may be configured to transmit data via the communications network 155.

The memory 125 may include a database management system (DBMS) 135, a result set 140, a query 145, and applications 150. Although these elements are illustrated as residing in the memory 125, any of the elements, or combinations thereof, may reside in the storage 130 or partially in the memory 125 and partially in the storage 130. Each of these elements will be described in greater detail in accordance with FIG. 2.

The network 155 may be any suitable network or combination of networks and may support any appropriate protocol suitable for communication of data and/or code to/from the server computer system 100 and the client computer system 160. In some embodiments, the network 155 may support wireless communications. In other embodiments, the network 155 may support hardwired communications. The network 155 may be the Internet and may support Internet Protocol in some embodiments. In other embodiments, the network 155 may be implemented as a local area network (LAN) or a wide area network (WAN). The network 155 may also be implemented as a cellular data network. Although the network 155 is shown as a single network in the figures, one or more networks of the same or different types may be included.

The client computer system 160 may include some or all of the hardware and software elements of the computer system 100 previously described. As shown, there may be one or more client computers 160 connected to the computer system 100 via the network 155. In some embodiments, one or more client computers 160 may send a query 145 by network 155 to computer system 100 and receive a result set 140.

Figure 2:
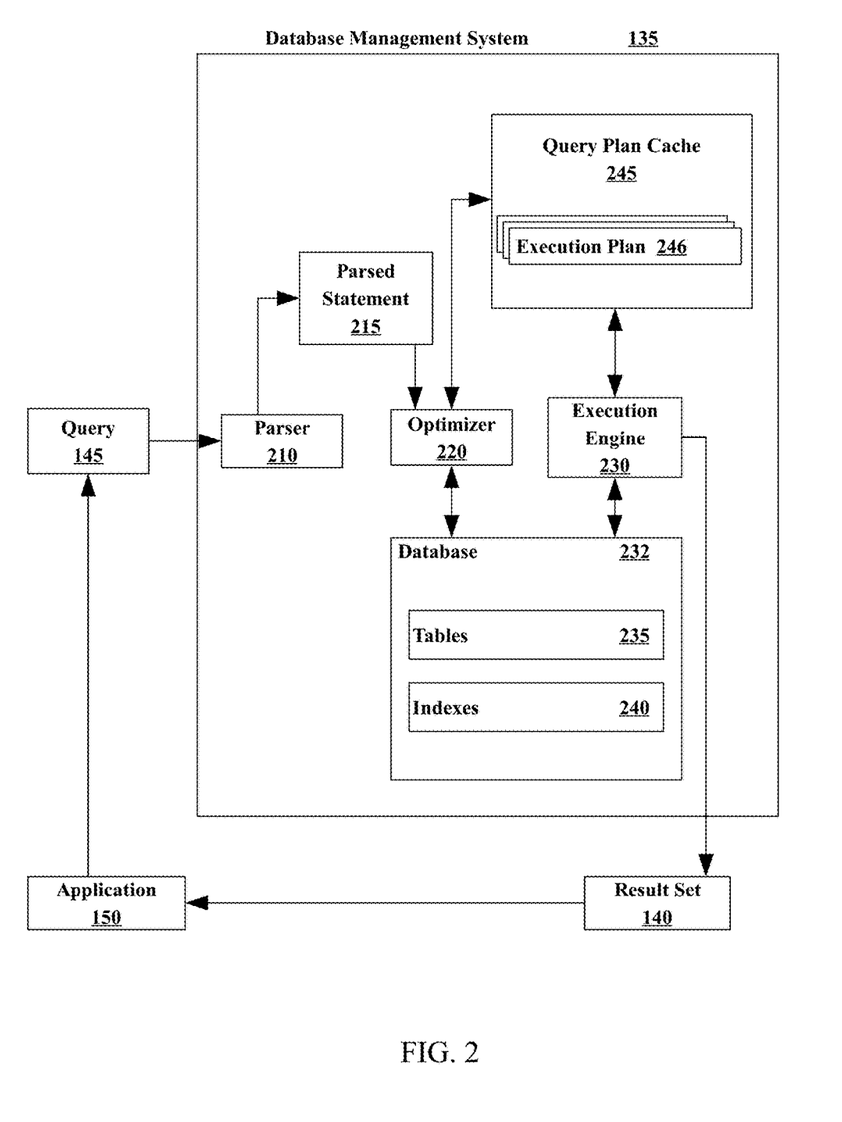
FIG. 2 illustrates an example database management system (DBMS) according to an embodiment.

FIG. 2 illustrates an example database management system (DBMS) 135. The DBMS 135 may include a parser 210, an optimizer 220, an execution engine 230, and a database 232. The parser 210 may receive a database query 145 from an application 150. In some embodiments, the database query 145 may be in the form of a Structured Query Language (SQL) statement. The parser 210 may generate a parsed statement 215. The parser 210 may send the parsed statement 215 to an optimizer 220. The optimizer 220 may attempt to optimize the parsed statement. In some embodiments, optimizing may improve the performance of the database query 145 by, for example, reducing the amount of time it takes to provide a user with a response. The optimizer 220 may generate an execution plan 246 (access plan), which may be maintained in a query plan cache 245, according to some embodiments. The query plan cache 245 may include one or more execution plans 246, including the current execution plan as well as previously used execution plans. Once an execution plan 246 is generated, the execution plan 246 may be sent to the execution engine 230. The execution engine 230 may execute the query 145. Executing the query 145 may include finding and retrieving data in the database tables 235 that satisfies the criteria supplied in the query 145. The execution engine 230 may store the data returned matching the query 145 in a result set 140. The DBMS 135 may return the result set 140 to an application 150, such as the application in which the database query 145 was generated, as a response to the database query 145.

A database 232 may include one or more tables 235 and, in some embodiments, one or more indexes 240. A database table 235 may organize data into rows and columns. Each row of a database table 235 may correspond to an individual entry, a tuple, or a record in the database 232. A column may define what is stored in each entry, tuple, or record. In some embodiments, columns of a table 235 may also be referred to as fields or attributes. Each table 235 within the database 232 may have a unique name. Each column within a table 235 may also have a unique name. A row, tuple, or record, however, within a particular table 235 may not be unique, according to some embodiments. A database 232 may also include one or more indexes 240. An index 240 may be a data structure that may inform the DBMS 135 of the location of a particular record within a table 235 if given a particular indexed column value. In some embodiments, the execution engine 230 may use the one or more indexes 240 to locate data within a table 235. In other embodiments, the execution engine 230 may scan the tables 235 without using an index 240.

As mentioned herein, the optimizer 220 creates the query access plan. The optimizer 220 may be implemented as computer program instructions that optimize the access plan in dependence upon database management statistics. Database statistics may reveal, for example, that there are only two identification values in a transactions table—so that it is an optimization, that is, more efficient, to scan the transactions table rather than using an index. Alternatively, database statistics may reveal that there are many transaction records with only a few transaction records for each identification value—so that it is an optimization, that is, more efficient, to access the transaction records by an index.

Figure 3:
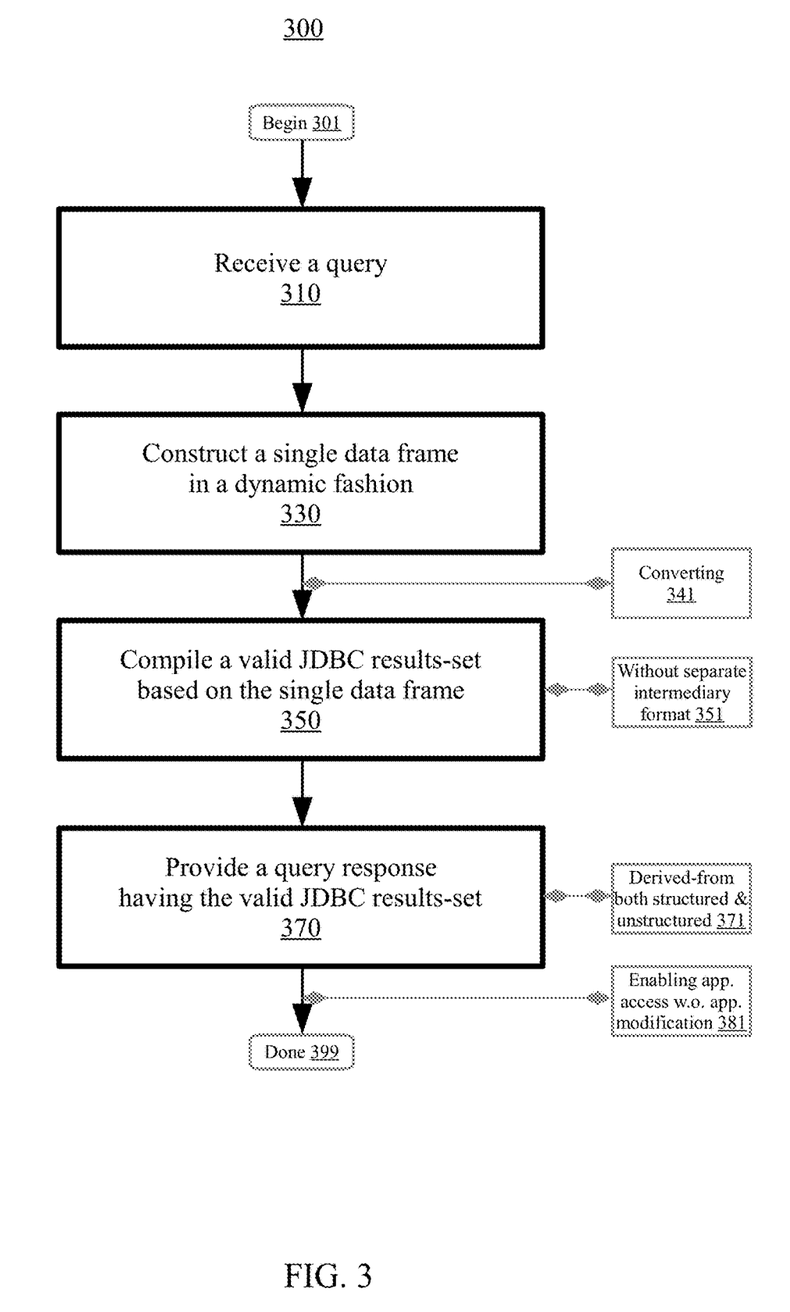
FIG. 3 is a flowchart illustrating a method for structured data and unstructured data integration management to provide a valid Java Database Connectivity (JDBC) results-set according to embodiments.

FIG. 3 is a flowchart illustrating a method 300 for structured data and unstructured data integration management to provide a valid Java Database Connectivity (JDBC) results-set according to embodiments. Aspects can include developing a Java framework that can access both structured and unstructured in a seamless fashion. As such, dynamic (on-the-fly, real-time) joins may be made across the structured and unstructured data. Subsequently, the joined data may be returned as a standard/valid JDBC results-set or the like. Method 300 may begin at block 301.

At block 310, a query is received by a database driver. Receiving can include detecting, sensing, accepting as an input, or otherwise accepting delivery of the query. The query may be received by a database management system or the like. A driver such as a database driver can include a set of software routines used to direct a device or interface. The database driver may include a software routine that accesses a database, stores data in the database, processes database-type data, or the like. The database driver can allow an application or compiler to access, store, or process a particular database format. In various embodiments, the database driver may select directories where data sources are located, search directories for data files, display data to be input or updated, load general information and data definitions from data sources, create database tables configured for storing information from data sources, save general information and data definitions from data sources, load data definitions codes/data into a database, or the like.

At block 330, a single data frame having both a set of structured data and a set of unstructured data is constructed. The single data frame may be constructed by the database driver. The single data frame can be constructed in a dynamic fashion (e.g., streamlined, in real-time, on-the-fly). The single data frame can be constructed in response to receiving the query (e.g., when executing the query). Constructing can include establishing, creating, generating, structuring, assembling, joining, forming, organizing, or introducing. A data frame can include a distributed collection of data organized into named columns. The data frame may be similar to (e.g., equivalent to) a table in a relational database. The data frame can be generated from various sources such as structured data files, tables, external databases, or the like. In general, the data frame may supply a domain-specific language in accordance with distributed data management or the like.

Structured data can include information with a substantial degree of organization in a manner such that inclusion in a relational database is seamless and readily able to be searched by a straightforward query, search engine algorithms, or other search operation. Accordingly, structured data can include information (e.g., text files) displayed in titled columns and rows which can easily be ordered and processed by data mining tools (e.g., the data stored in fields in a database). Unstructured data can include information which is without an (easily) identifiable/recognizable internal structure. Accordingly, unstructured data may refer to information that does not reside in a traditional row-column database (e.g., books, journals, documents, metadata, health records, audio, video, analog data, images, files, and unstructured text such as the body of an e-mail message, Web page, or word-processor document). As such, unstructured data may include information that does not have a pre-defined data model or is not organized in a pre-defined manner.

At block 350, a valid JDBC results-set for the query is compiled. The valid JDBC results-set for the query can be compiled by the database driver. The valid JDBC results-set for the query may be based on the single data frame (e.g., a joined data frame). Compiling can include resolving, determining, establishing, computing, formulating, or assembling. With respect to the valid JDBC results-set, the tangible output results for distinct queries may be different due to different inputs, but such results would be valid. In certain instances, the results may be substantively the same (e.g., same content/information) in a different form/organization (e.g., different order). A JDBC results-set may be oriented for use with relational databases. In embodiments, the single data frame is converted into the valid JDBC results-set by the database driver writing/creating a set of extensions to a set of Apache Spark classes (e.g., without storing information in a data store) at block 341. In certain embodiments, the valid JDBC results-set is compiled without a conversion to a separate format at block 351. For example, schema available in the single data frame (e.g., joined data frame) can be converted to a JDBC results-set metadata object. Data available in the data frame object can be converted to a JDBC results-set. The created JDBC metadata object may be associated to the results-set object (e.g., to be returned to the application which initiated the query).

At block 370, a query response is provided. The query response may have the valid JDBC results-set. The query response can be provided by the database driver. Providing can include transmitting, sending, conveying, displaying, presenting, messaging, or notifying. Providing the query response having the valid JDBC results-set can include routing the valid JDBC results-set to the originator of the query, processing an output with respect to the valid JDBC results-set, returning the valid JDBC results-set to a query management engine, or displaying at least a portion of a valid JDBC results-set (e.g., to a user) as at least a portion of the query response. In various embodiments, the valid JDBC results-set is derived-from (e.g., arises-out-of) both the set of structured data and the set of unstructured data at block 371 (e.g., not only what preexisted structured data, unstructured data has been transformed). In embodiments, the database driver may use the valid JDBC results-set to enable an application to access both the set of structured data and the set of unstructured data without modification to the application (e.g., seamless access for applications, direct ingestion for JDBC-style applications, without a preloading operation, without an unstructured data adapter) at block 381.

Method 300 concludes at block 399. Aspects of method 300 may provide performance or efficiency benefits with respect to structured data and unstructured data integration management to provide a valid JDBC results-set. For example, aspects of method 300 may include positive impacts on resource usage (e.g., memory) or speed (e.g., processing) by providing the valid JDBC results-set without intermediate processing or storage operations. In embodiments, performance or efficiency benefits when processing a query using a database management system may occur (e.g., speed, flexibility, load balancing, responsiveness, productivity).

Figure 4:
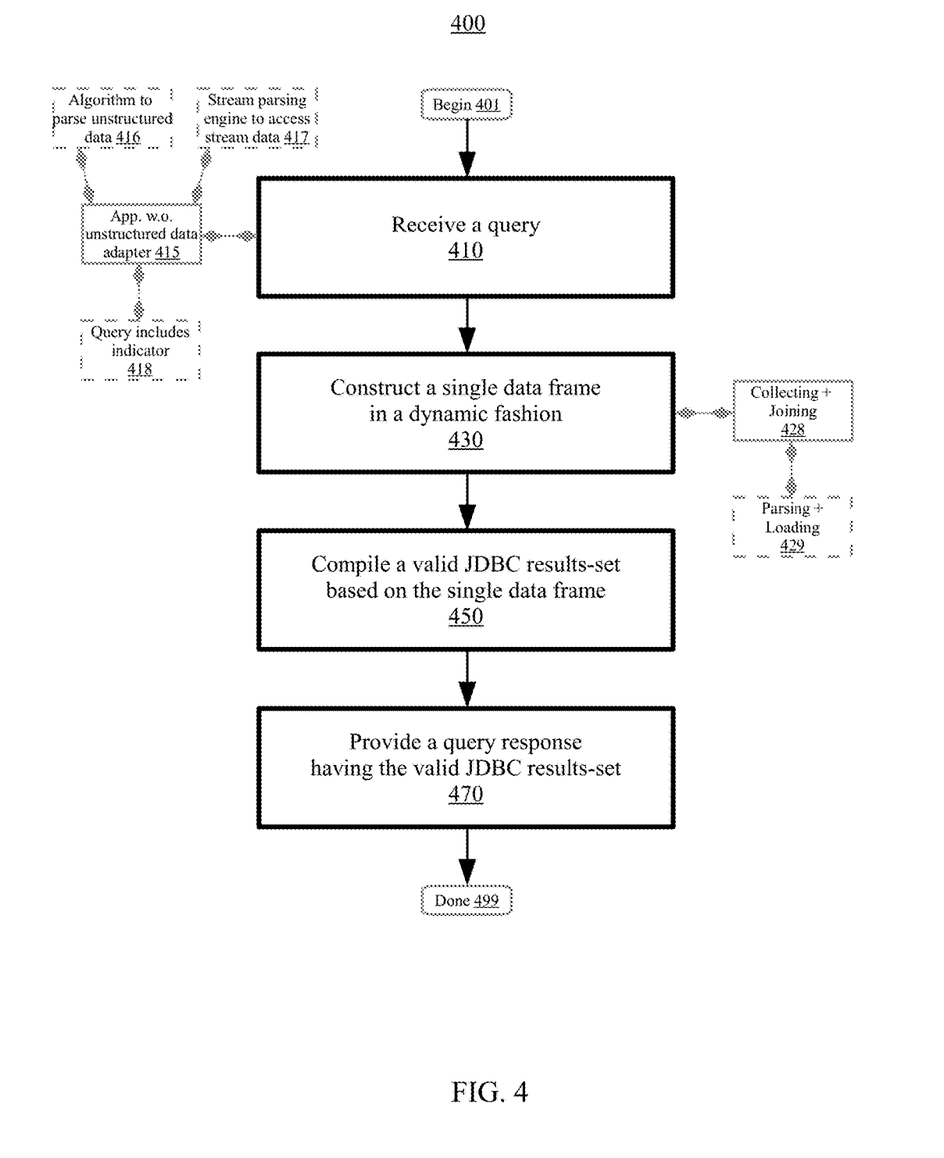
FIG. 4 is a flowchart illustrating a method for structured data and unstructured data integration management to provide a valid Java Database Connectivity (JDBC) results-set according to embodiments.

FIG. 4 is a flowchart illustrating a method 400 for structured data and unstructured data integration management to provide a valid Java Database Connectivity (JDBC) results-set according to embodiments. Aspects of method 400 may be similar or the same as aspects of method 300 and aspects may be utilized with other methodologies described herein (e.g., method 300, method 500). Aspects of the method 400 may substantially correspond to other embodiments described herein, including FIGS. 1-5 and the related descriptions. Method 400 may begin at block 401. A query is received by a database driver at block 410. In response to receiving the query, a single data frame having both a set of structured data and a set of unstructured data is constructed in a dynamic fashion by the database driver at block 430. Based on the single data frame, a valid JDBC results-set for the query is compiled by the database driver at block 450. Accordingly, a query response having the valid JDBC results-set is provided by the database driver at block 470.

In embodiments, the query is received-from and the query response is provided-to an application configured without an unstructured data adapter (e.g., the application is not configured to ingest unstructured data, the application is not coupled with a separate module to ingest unstructured data) at block 415. In various embodiments, the unstructured data adapter includes an algorithm to parse unstructured data (e.g., a Java library) at block 416. In various embodiments, the unstructured data adapter includes a stream parsing engine to access streaming data at block 417. Aspects described herein using the database driver may permit the utilization of unstructured data or streaming data by the application. In certain embodiments, the query includes an indicator which indicates that the application is configured without the unstructured data adapter (e.g., a tag or label which indicates/signifies a need for aspects described herein in order to utilize unstructured data) at block 418.

In embodiments, the database driver collects the set of structured data in a first data frame and collects the set of unstructured data in a second data frame at block 428. Collecting can include accumulating, acquiring, aggregating, capturing, gathering, obtaining, retrieving, or the like. The collecting can occur in an on-going (e.g., real-time, streamlined) basis. To construct the single data frame, the database driver may join the first and second data frames (e.g., using a join key) also at block 428. In certain embodiments, the collection operation(s) includes using Apache Spark to parse the set of unstructured data (e.g., separate a block of social media data into a plurality of segments) and load the set of unstructured data in the second data frame at block 429. For example, consumer database information from a set of proprietary grocery store data may be joined with social media data from publicly available information in response to the query.

Method 400 concludes at block 499. Aspects of method 400 may provide performance or efficiency benefits with respect to structured data and unstructured data integration management to provide a valid JDBC results-set. For example, aspects of method 400 may include positive impacts on resource usage (e.g., memory) or speed (e.g., processing) by providing the valid JDBC results-set without intermediate processing or storage operations. In embodiments, performance or efficiency benefits when processing a query using a database management system may occur (e.g., speed, flexibility, load balancing, responsiveness, productivity).

Figure 5:
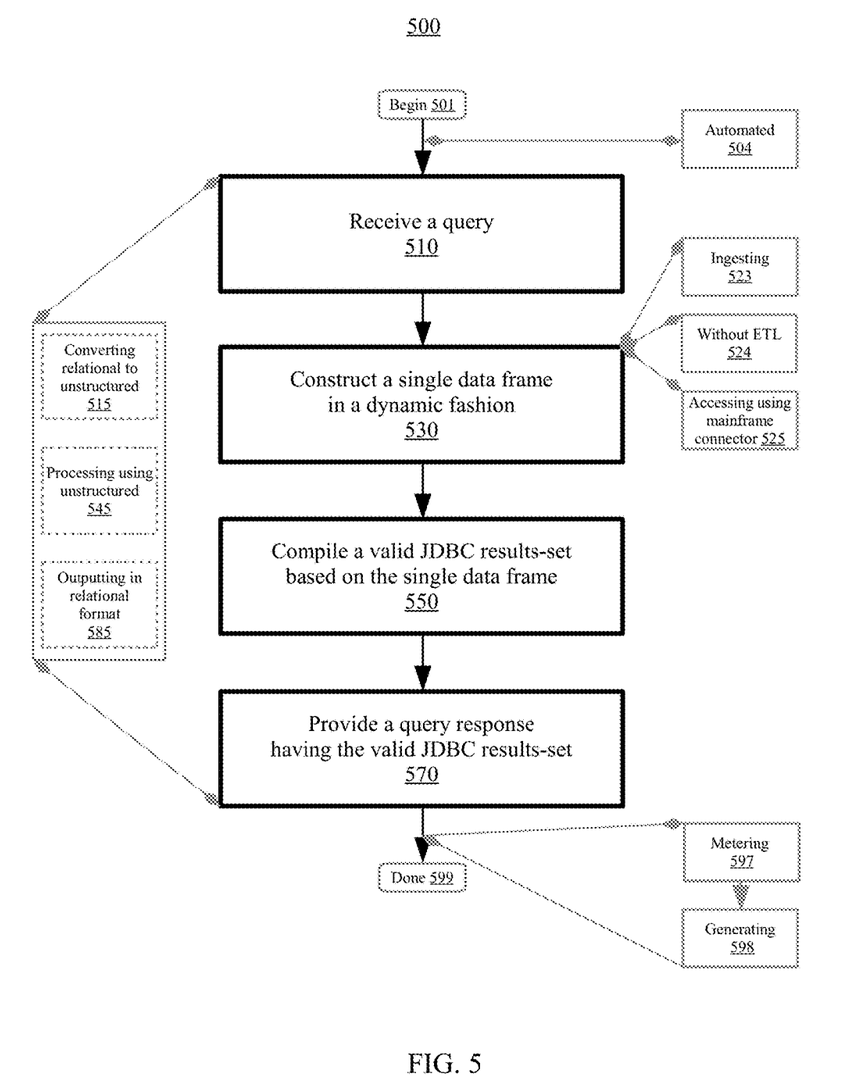
FIG. 5 is a flowchart illustrating a method for structured data and unstructured data integration management to provide a valid Java Database Connectivity (JDBC) results-set according to embodiments.

FIG. 5 is a flowchart illustrating a method 500 for structured data and unstructured data integration management to provide a valid Java Database Connectivity (JDBC)

results-set according to embodiments. Aspects of method 500 may be similar or the same as aspects of method 300 and aspects may be utilized with other methodologies described herein (e.g., method 300, method 400). Aspects of the method 500 may substantially correspond to other embodiments described herein, including FIGS. 1-5 and the related descriptions. Method 500 may begin at block 501. A query is received by a database driver at block 510. In response to receiving the query, a single data frame having both a set of structured data and a set of unstructured data is constructed in a dynamic fashion by the database driver at block 530. Based on the single data frame, a valid JDBC results-set for the query is compiled by the database driver at block 550. Accordingly, a query response having the valid JDBC results-set is provided by the database driver at block 570.

In embodiments at block 504, the operational steps such as the receiving, the constructing, the compiling, and the providing each occur in an automated fashion without user intervention or manual action (e.g., using automated computing machinery, fully machine-driven without manual stimuli). The automated operational steps may be performed by the database driver (e.g., as part of a database management system). In embodiments, a relational/structured feature (e.g., portion of the query) of the query may be converted/mapped into an unstructured feature (e.g., a query understandable by an unstructured data adapter) at block 515. The query can be processed using the unstructured feature at block 545. Subsequently, the query response may be output in a relational format (e.g., a results-set understandable by a relational database management system) at block 585.

In various embodiments, the set of unstructured data is ingested (e.g., consumed) without loading, storing, or saving the set of unstructured data into a database or data store (e.g., to save on processing and network flow/traffic/bandwidth) at block 523. In embodiments, aspects occur without using an Extract, Transform and Load (ETL) operation to capture the set of unstructured data in a structured database (e.g., without using transformation logic to bring unstructured data into a structured database via ETL before accessing as JDBC results-sets) at block 524. In certain embodiments, the database driver may use a mainframe connector to bypass a database layer in order to access a set of storage devices having both the set of structured data and the set of unstructured data at block 525. For example, connectors may be developed to access data directly from disk storage (bypassing the database layer for higher speed). For instance, mainframe connectors may access mainframe data directly from data-sets. Aspects of the database driver described herein can be applied to such configurations to expose disk retrieved data as valid JDBC results-sets.

In certain embodiments, a usage assessment may be generated with respect to the structured data and unstructured data integration management. Use of the structured data and unstructured data integration management may be metered at block 597. For example, service-life extensions may be measured or functional up-time relative to a benchmark (e.g., historical functional up-time) can be evaluated, etc. Such factors may correlate to charge-back or cost burdens which can be defined in-advance (e.g., utilizing usage tiers) or scaled with respect to a market-rate. An invoice or bill presenting the usage, rendered services, fee, and other payment terms may be generated based on the metered use at block 598. The generated invoice may be provided (e.g., displayed in a dialog box, sent or transferred by e-mail, text message, initiated for traditional mail) to the user for notification, acknowledgment, or payment.

Method 500 concludes at block 599. Aspects of method 500 may provide performance or efficiency benefits with respect to structured data and unstructured data integration management to provide a valid JDBC results-set. For example, aspects of method 500 may include positive impacts on resource usage (e.g., memory) or speed (e.g., processing) by providing the valid JDBC results-set without intermediate processing or storage operations. In embodiments, performance or efficiency benefits when processing a query using a database management system may occur (e.g., speed, flexibility, load balancing, responsiveness, productivity).

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for structured data and unstructured data integration management to provide a valid Java Database Connectivity (JDBC) results-set, the method comprising:
   receiving, by a database driver, a query, wherein the query is received from an application configured without an unstructured data adapter;
   constructing, in a dynamic fashion by the database driver in response to receiving the query, a single data frame having both a set of structured data and a set of unstructured data;
   compiling, by the database driver based on the single data frame, a valid JDBC results-set for the query; and
   providing, by the database driver, a query response having the valid JDBC results-set wherein the query response is provided to the application configured without the unstructured data adapter.

2. The method of claim 1, wherein the valid JDBC results-set is derived-from both the set of structured data and the set of unstructured data.

3. The method of claim 1, further comprising:
   collecting, by the database driver, the set of structured data in a first data frame;
   collecting, by the database driver, the set of unstructured data in a second data frame; and
   joining, by the database driver to construct the single data frame, the first and second data frames.

4. The method of claim 3, wherein collecting, by the database driver, the set of unstructured data in the second data frame includes:
   parsing, using Apache Spark, the set of unstructured data; and
   loading, using Apache Spark, the set of unstructured data in the second data frame.

5. The method of claim 1, further comprising:
   converting, by the database driver, the single data frame into the valid JDBC results-set by writing a set of extensions to a set of Apache Spark classes.

6. The method of claim 1, wherein compiling the valid JDBC results-set occurs without a conversion to a separate format.

7. The method of claim 1, wherein the structured data and unstructured data integration management to provide the valid JDBC results-set occurs without using an Extract, Transform and Load (ETL) operation to capture the set of unstructured data in a structured database.

8. The method of claim 1, further comprising:
   accessing, by the database driver using a mainframe connector to bypass a database layer, a set of storage devices having both the set of structured data and the set of unstructured data.

9. The method of claim 1, further comprising:
   enabling, by the database driver using the valid JDBC results-set, an application to access both the set of structured data and the set of unstructured data without modification to the application.

10. The method of claim 1, wherein the unstructured data adapter includes:
    an algorithm to parse unstructured data.

11. The method of claim 1, wherein the unstructured data adapter includes:
    a stream parsing engine to access streaming data.

12. The method of claim 1, wherein the query includes an indicator which indicates that the application is configured without the unstructured data adapter.

13. The method of claim 1, further comprising:
    converting a relational feature of the query into an unstructured feature;
    processing the query using the unstructured feature; and
    outputting the query response in a relational format.

14. The method of claim 1, further comprising:
    ingesting the set of unstructured data without loading the set of unstructured data into a database.

15. The method of claim 1, wherein the receiving, the constructing, the compiling, and the providing each occur in an automated fashion without user intervention.

16. The method of claim 1, further comprising:
    metering use of the structured data and unstructured data integration management; and
    generating an invoice based on the metered use.

17. A system for structured data and unstructured data integration management to provide a valid Java Database Connectivity (JDBC) results-set, the system comprising:
    a memory having a set of computer readable computer instructions, and
    a processor for executing the set of computer readable instructions, the set of computer readable instructions including:
    receiving, by a database driver, a query, wherein the query is received from an application configured without an unstructured data adapter;
    constructing, in a dynamic fashion by the database driver in response to receiving the query, a single data frame having both a set of structured data and a set of unstructured data;
    compiling, by the database driver based on the single data frame, a valid JDBC results-set for the query; and
    providing, by the database driver, a query response having the valid JDBC results-set wherein the query response is provided to the application configured without the unstructured data adapter.

18. A computer program product for structured data and unstructured data integration management to provide a valid Java Database Connectivity (JDBC) results-set, the computer program product comprising a computer readable storage medium having program instructions embodied therewith, wherein the computer readable storage medium is not a transitory signal per se, the program instructions executable by a processor to cause the processor to perform a method comprising:

receiving, by a database driver, a query, wherein the query is received from an application configured without an unstructured data adapter;

constructing, in a dynamic fashion by the database driver in response to receiving the query, a single data frame having both a set of structured data and a set of unstructured data;

compiling, by the database driver based on the single data frame, a valid JDBC results-set for the query; and providing, by the database driver, a query response having the valid JDBC results-set wherein the query response is provided to the application configured without the unstructured data adapter.

19. The computer program product of claim 18, wherein at least one of:

the program instructions are stored in the computer readable storage medium in a data processing system, and wherein the program instructions were downloaded over a network from a remote data processing system; or the program instructions are stored in the computer readable storage medium in a server data processing system, and wherein the program instructions are downloaded over a network to the remote data processing system for use in a second computer readable storage medium with the remote data processing system.

* * * * *